United States Patent [19]
Kowalski

[11] Patent Number: 5,813,719
[45] Date of Patent: Sep. 29, 1998

[54] SIDE INTRUSION BEAM ASSEMBLY HAVING COMPENSATING WELDS AT BRACKETS

[75] Inventor: Daniel J. Kowalski, Lake Orion, Mich.

[73] Assignee: Trim Trends, Inc., Farmington Hills, Mich.

[21] Appl. No.: 937,514

[22] Filed: Sep. 25, 1997

[51] Int. Cl.⁶ ........................................................ B60J 5/04
[52] U.S. Cl. ........................................................ 296/146.6
[58] Field of Search ........................................... 296/146.6

[56] References Cited

U.S. PATENT DOCUMENTS

| | | |
|---|---|---|
| 4,800,638 | 1/1989 | Herringshaw et al. . |
| 5,188,276 | 2/1993 | Furuya et al. . |
| 5,232,261 | 8/1993 | Karoda et al. ........................ 296/146.6 |
| 5,325,632 | 7/1994 | Djavairian et al. . |
| 5,370,437 | 12/1994 | Alberda ................................ 296/146.6 |
| 5,404,690 | 4/1995 | Haaf .................................... 296/146.6 |
| 5,580,120 | 12/1996 | Nees et al. . |
| 5,603,581 | 2/1997 | Fujita et al. . |

FOREIGN PATENT DOCUMENTS

| | | | |
|---|---|---|---|
| 2692848 A1 | 12/1993 | France ................................ 296/146.6 |
| 405319092 A | 12/1993 | Japan .................................. 296/146.6 |

*Primary Examiner*—Gary C. Hoge
*Attorney, Agent, or Firm*—Dykema Gossett PLLC

[57] ABSTRACT

A side intrusion beam assembly has a pair of end brackets having weld portions. A beam body is coupled the weld portions of the brackets. The weld portion and the beam body having a gap therebetween. Weld material fills the gap and couples the beam body to the weld portion.

20 Claims, 2 Drawing Sheets

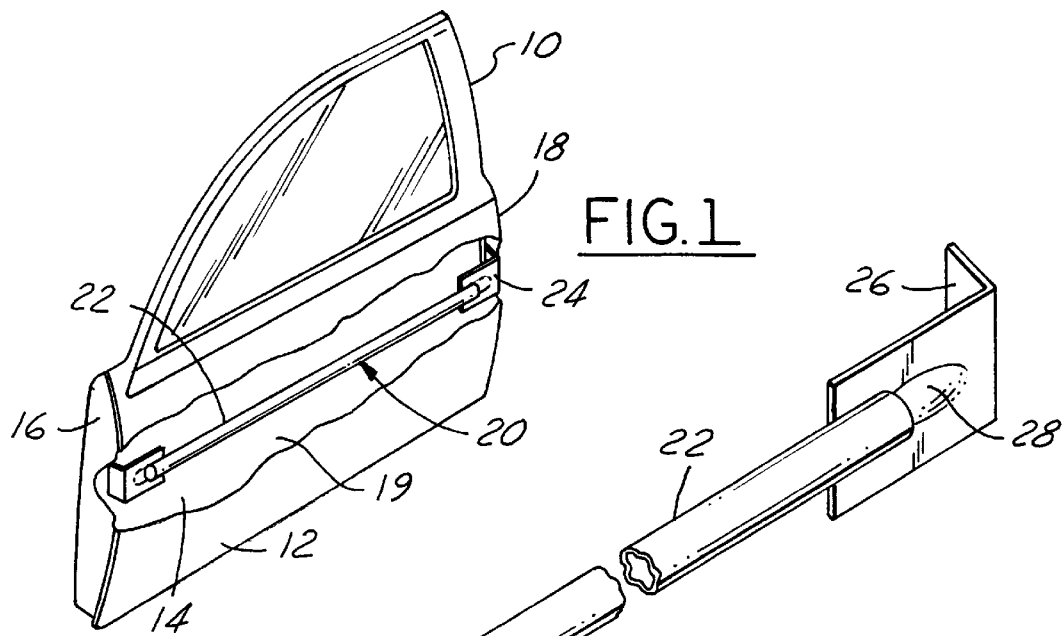
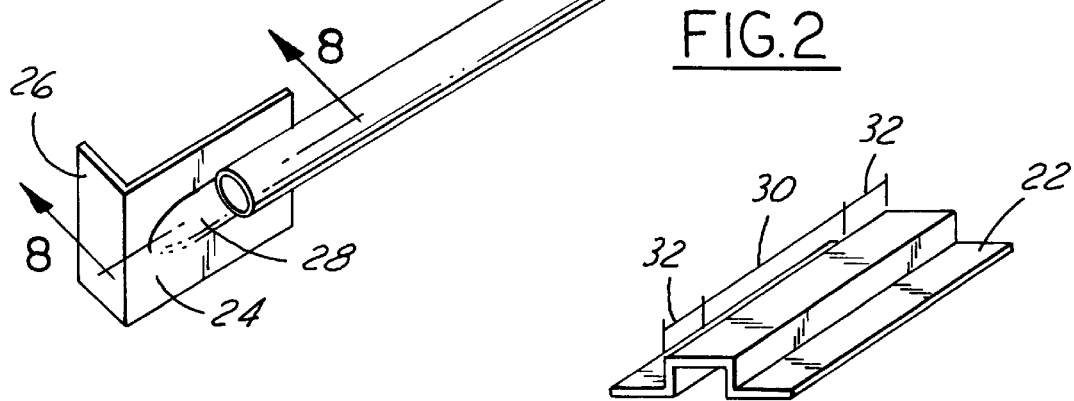
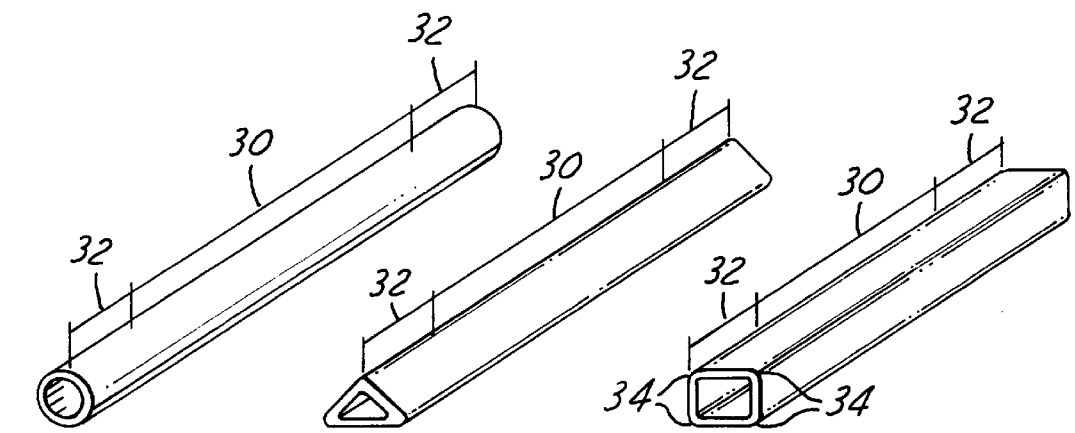

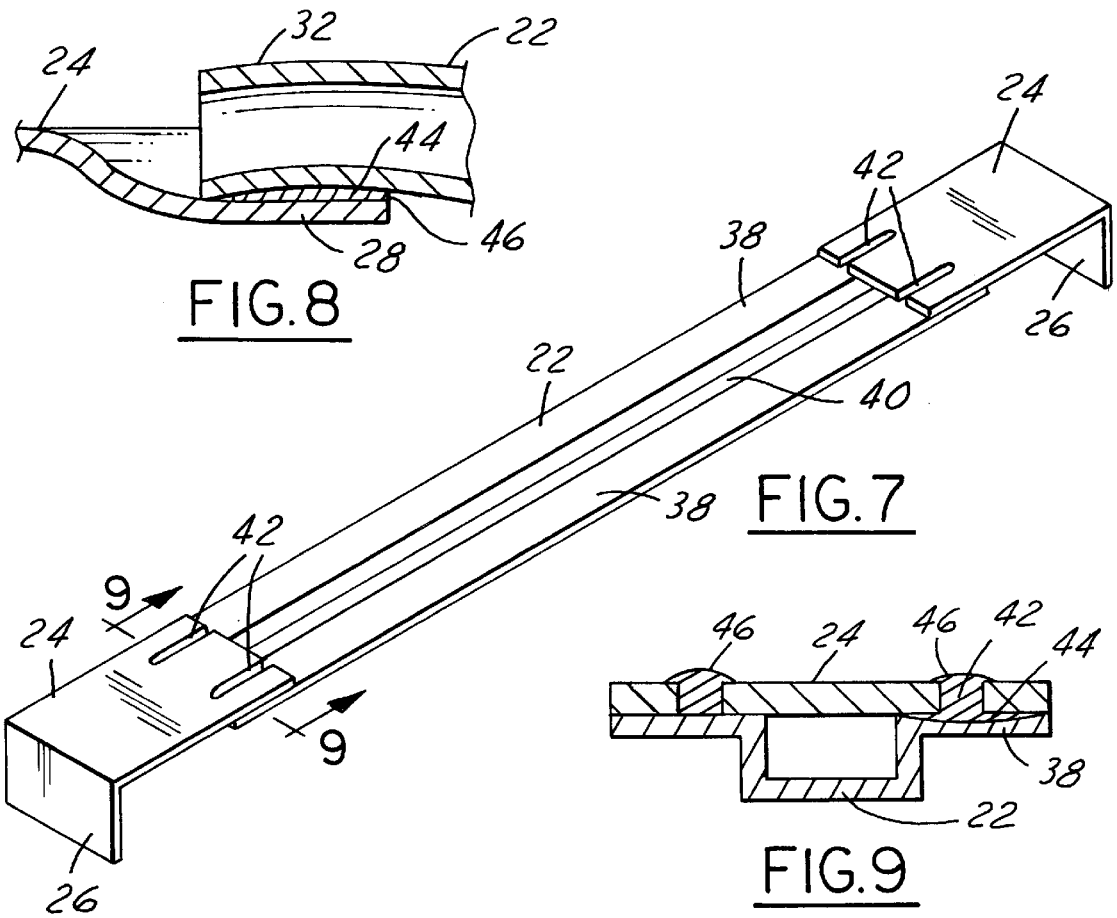
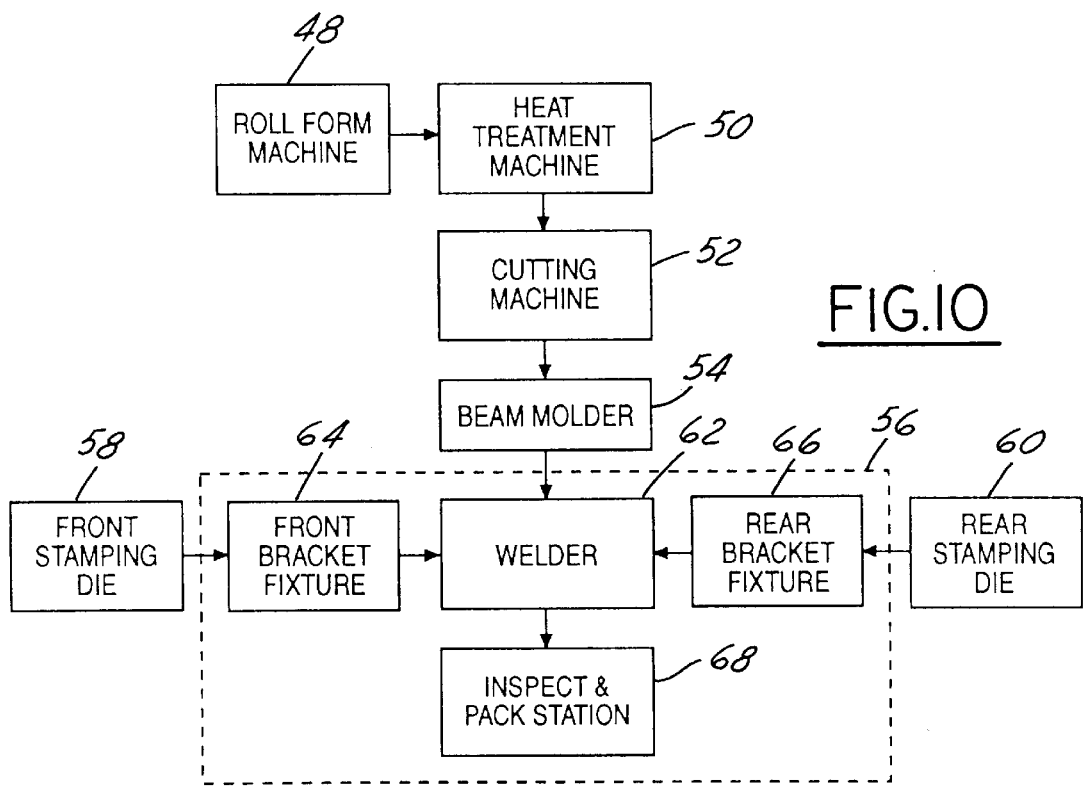

SIDE INTRUSION BEAM ASSEMBLY HAVING COMPENSATING WELDS AT BRACKETS

INCORPORATION BY REFERENCE

The present invention is related to copending application entitled "Selectively Heat Treated Side Intrusion Beams and Method for Making the Same" (attorney docket number 64851-0010), which is commonly owned, and hereby incorporated by reference herein. The present invention is related to copending application entitled "Method And Apparatus For Forming Side Intrusion Beams Having Compensating Welds At Brackets" (attorney docket number 64,851-008), which is commonly owned, file simultaneously herewith and hereby incorporated by reference herein.

BACKGROUND OF THE INVENTION

The present invention relates to a side intrusion beam for a door of an automotive vehicle and, more particularly, to a side intrusion beam assembly.

To improve safety in motor vehicles, side intrusion beams, also called side impact beams, have been designed into the passenger doors of automotive vehicles. Side intrusion beams are typically formed of a steel. The side intrusion beams extend across the vehicle doors to provide occupant protection. Typically, the side intrusion beams have a beam body with a pair of brackets mounted at each end. The brackets are used to mount the beam within the door. Commonly, side intrusion beam manufacturers provide the beam body and bracket assembly to the automotive vehicle manufacturer for installation as the door is being assembled.

Federal motor vehicle safety standards require that side intrusion beams meet certain load or energy absorbing criteria for a specified lateral displacement of the door in response to a vehicle being subjected to a side impact. Reducing the cost of implementing the federal safety standards is an ever present goal of automotive vehicle manufacturers. One way in which to reduce costs is to reduce the number of rejected beam assemblies during manufacture of the beams.

Several examples of side intrusion beams use a beam body which is formed of heat treated steel. The beam body is subjected to heat treating throughout the length of the beam. The beam is then welded to the end brackets that are not heat treated. Commonly, long lengths of heat treated steel material is provided to the manufacturer of the side intrusion beam. The beam body is cut to length and then welded to the end brackets. During welding the beam and the brackets are brought in contact with each other. The side intrusion beam assembly is provided to the assembly plant. The brackets are welded to the door during manufacture of the door. If the assembly does not align properly with the door it becomes a reject or it is physically modified to fit into place.

One source of distortion in the beam assembly is that during heat treatment the beam bodies tend to warp slightly. Because the brackets fully contact the beam, any distortion in the beam is transferred to the side intrusion beam assembly. The side intrusion beam assembly must then be physically manipulated to properly fit within the vehicle door. Some beams may even be unusable. Misaligned beams are thus a waste of valuable resources.

SUMMARY OF INVENTION

It is therefore an object of the invention to provide a side intrusion beam assembly that has an improved fit with respect to the vehicle door.

One aspect the present invention provides a side intrusion beam assembly that has a pair of end brackets having a weld portion. A beam body is coupled the weld portions of the brackets. The weld portion and the beam body have a gap therebetween. Weld material fills the gap and couples the beam body to the weld portion.

One advantage of the present invention is that fewer side intrusion beam assemblies are rejected due to unaligned brackets.

BRIEF DESCRIPTION OF THE DRAWINGS

Other features and advantages of the present invention will become apparent in the following detailed description which should be read in conjunction with the drawings:

FIG. 1 is a perspective view of an automotive vehicle door having a door beam formed according to the present invention;

FIG. 2 is a perspective view of an automotive vehicle side intrusion beam assembly according to the present invention;

FIG. 3 is a perspective view of the beam body having a round cross section;

FIG. 4 is a perspective view of the beam body having a triangular cross section;

FIG. 5 is a perspective view of the beam body having a rectangular cross section;

FIG. 6 is a perspective view of the center beam of a side intrusion beam having a hat-shaped cross section;

FIG. 7 is a perspective view of a round cross section side intrusion beam having multiple heat treated and non heat treated portions;

FIG. 8 is a partial longitudinal cross-sectional view through line 8—8 of FIG. 2 of a beam body with respect to a bracket formed according to the present invention;

FIG. 9 is a partial lateral cross-sectional view through line 9—9 of FIG. 7 of a beam body with respect to a bracket formed according to the present invention; and FIG. 10 is a diagrammatic representation of an apparatus for forming the present invention.

DETAILED DESCRIPTION OF THE PREFERRED EMBODIMENT

In the following figures, like reference numerals will be used to represent like components. The figures illustrate a side intrusion beam having particular cross sections and having particularly shaped end brackets. However, other shaped end brackets and cross sections would be evident to those skilled in the art.

Referring to FIG. 1, a vehicle door 10 is adapted to be hingedly mounted to a vehicle body. Door 10 includes an outer sheet metal panel 12, an inner sheet panel 14, and metal front and rear end walls 16 and 18, respectively, to which the outer and inner panels 12 and 14 are welded. The outer panel 12, the inner panel 14 and the end walls 16 and 18 define a door well 19 therebetween. In order to structurally reinforce door 10 against side door impacts, a side intrusion beam 20 is mounted horizontally within door well 19 and secured to end walls 16 and 18 to form a protective impediment across door 10. Side intrusion beam 20 is designed to absorb the energy of impact against vehicle door 10. The side intrusion beam assembly processed according to the present invention provides a cost efficient method for processing the beam while maintaining federal vehicle safety standards.

Referring now to FIGS. 1 and 2, side intrusion beam 20 generally includes an elongated beam body 22 having a predetermined cross sectional configuration as will be described below. As illustrated in FIG. 2, beam body has a circular and tubular shape. Side intrusion beam 20 also includes end brackets 24. End brackets 24 are welded to beam body 22 as will be further described below. End brackets 24 have flanges 26. Flanges 26 are used to mount brackets 24 to end walls 16 and 18. Commonly, end brackets 24 are spot welded to end walls 16 and 18 during assembly of the door. End brackets 24 may also have a recess 28 that acts as a weld section which is used to locate beam body 22 with respect to end brackets 24 during welding of the beam body 22 to end brackets 24. Various shapes of end brackets and mounting configurations such as recess 28 would be evident to those skilled in the art. Such shapes are dictated by the package space given by the automobile manufacturer within which to fit the side intrusion beam.

Referring now to FIGS. 3, 4, 5 and 6, various cross sections of beam bodies 22 are illustrated, each being manufactured according to the process of the present invention. It is preferred that each of beams 22 have a center portion 30, that is heat treated and end portions 32 that are not heat treated. End portions 32 are secured to brackets 24 as shown in FIG. 2. However, if desired, end portions 32 may be heat treated as well.

Beam body 22 of FIG. 3 has a round cross section that uses less material than the other cross sections. Because there are no corners in a round cross section, heat treating may be applied more evenly across center portion 30.

In FIG. 4 a triangular tube is illustrated. Experimentally it has been found that a triangular shaped tube is very cost effective in terms of strength per amount of material utilized.

In FIG. 5 a rectangular tubular beam is illustrated. A rectangular tube such as a square tube has the highest strength of the beam bodies 22 illustrated. The rectangular tube has rounded corners 34. As the radius of corners 34 are increased the load bearing characteristics of the rectangular tube more closely approximate the characteristics of a round tube such as that shown in FIG. 3.

FIG. 6 illustrates a hat-shaped cross section. Hat-shaped cross sections are commonly used for side intrusion beams. The hat-shape is formed from a pair of flanges 38 and a channel 40 therebetween. By having the capability to use various cross sections, the load bearing characteristics for beam body 22 may be changed to suit the needs for a particular application.

Referring now to FIG. 7, a side intrusion beam assembly is modified to accommodate a hat-shaped beam body 22 such as that shown in FIG. 6. Beam body 22 may be welded at flanges 38 directly to brackets 24. More preferably, however, end brackets 24 have slots 42 therethrough. Slots 42 preferably align with flanges 38. In such a manner, weld material may be used to fill the slots 42 and join flanges 38 with brackets 24.

Referring now to FIG. 8, beam body 22 may be warped in various ways during heat treatment. Most commonly, beam bodies 22 warp slightly in the longitudinal direction. However, deformation in the lateral direction is also possible. That is, the beam ends may warp slightly so that the beam is no longer perfectly straight. In such a case end 32 of beam body 22 may not fully contact bracket 24 and has at recess 28. In such a manner, a gap 44 is formed between bracket 24 and beam body 22. Weld material 46 is used to join beam body 22 to bracket 24. Weld material 46 fills gap 44 to compensate for any variance between the beam body and bracket. Weld material 46 solidifies to hold the beam with respect to bracket 24. The length of the gap that may be filled while still retaining the strength of the beam varies depending on the materials involved. The maximum desired gap may, for example, be about one millimeter.

Referring now to FIG. 9, a hat-shaped beam body 22 is shown. Beam body 22 may be deformed with respect to the lateral direction. A beam body 22 having a hat-shaped section may also be warped laterally along flange 38. Beam body 22 may be joined to bracket 24 by applying weld material within slot 42. If any gap 44 is present on flange 38, weld material 46 flows into slot 42 and into gap 44.

Referring now to FIG. 10, a flexible manufacturing system is illustrated that is suitable for manufacturing various styles of side intrusion beam assemblies with only slight modification. In such a manner, the cost of providing production manufacturing equipment is reduced since a significant portion of the apparatus remains unchanged. Also the apparatus may be easily modified in a short amount of time to accommodate alternative side intrusion beam assemblies. In such a manner a full production capability may be utilized for producing side intrusion beam assemblies for various models.

A roll form machine 48 may be used to form beam stock from which beam bodies 22 are made. Beam stock may, for example, be any of beam stock illustrated in FIGS. 3 through 6. Commonly, beam stock is provided in long lengths between 15 and 20 feet. Roll forming machine 48 processes flat material into the desired shape which may include welding for tubular products. Roll forming machine 48 may be part of a continuous process for forming side intrusion beam assemblies. Roll forming machine 48 may also be in a separate area and the beam stock transported to the rest of the apparatus. Roll forming machines 48 are commonly known in the art.

Heat treatment machine 50 receives the beam stock from roll forming machine 48. A direct feed or manual feed may be used between roll forming machine 48 and heat treatment machine 50. Heat treatment machine 50 preferably heat processes the beam stock in a selective manner so that selectively heat treated beams such as that shown in FIGS. 3 through 6 may be formed.

A cutting machine 52 is illustrated as receiving processed beam stock from heat treatment machine 50. Cutting machine 52 may also receive material from roll forming machine 40 and size beam stock prior to entering heat treatment machine 50. Cutting machine 52 may, for example, be a knife cut or moving arm saw. Because the cutting is preferably performed at non heat treated portions of beam stock either before or after heat treatment machine 50, expensive cutting processes such as laser cutting or plasma cutting need not be utilized. Preferably, the combination of heat treatment machine 50 and cutting machine 52 are integrated.

A beam holder 54 receives sized beam bodies from cutting machine 52. Beam holder 54 may be a bin into which sized beam bodies are placed before being transported to side intrusion assembly apparatus 56. Beam holder 54 may also be a conveyor or other automated feed system to supply beam bodies to assembly apparatus 56.

Assembly apparatus 56 receives beam bodies from beam holder 54 and brackets from front stamping die 58 and rear stamping die 60. Front stamping die 58 and rear stamping die 60 may be coupled directly to assembly apparatus 56 wherein unshaped metal is formed into brackets and directly set into assembly apparatus 56. Front stamping die 58 and rear stamping die 60 may simply be parts bin having previously stamped brackets therein. The brackets may be manually or automatically supplied to assembly apparatus 56.

Assembly apparatus 56 is comprised of a welder 62, a front bracket fixture 64 and a rear bracket fixture 66. Front bracket fixture 64 and rear bracket fixture 66 position their respective brackets in a location that corresponds to their relative locations within the door of the vehicle. These locations are referred to in the art as "net" points. The net points may be defined by locating pins onto which the brackets are placed. The brackets may then be forced into place on the locating pins.

The brackets and beam body may be brought together in two manners. That is, the beam body may be held in position while the brackets are brought together with it. In the alternative, the brackets may be held in a fixed position while the beam body is brought to them. In either case, the brackets are held to maintain their relative position to where they are attached within the vehicle door. The beam body is not forced into place. That is the beam body is placed relative to the bracket so that the beam body in a sense "floats" with respect to the brackets. By "floating" the beam and bracket are not forced together to touch in all locations. In such a manner, when the side intrusion beam assembly is released from fixtures 64 and 66, the brackets will maintain their relative positions with respect to the beam today.

By allowing the beam to "float", gaps are allowed to form between the brackets and the beam. Welder 62 is used to apply weld material to the area to be welded. Weld material is preferably supplied to the recessed portion of the brackets prior to bringing the beam body together with the bracket. Welder 62 may also supply weld material, for example, to slots 42 of the brackets after the beam body is positioned relative to the beam body. The weld material thus compensates for any gaps between the beam body and the weld portion.

Once the weld material is solidified, side intrusion beam assemblies are removed from the machine either automatically or manually and inspected and packed at inspection and packing station 68.

While the best mode for carrying out the present invention has been described in detail, those familiar with the art to which this invention relates will recognize various alternative designs and embodiments for practicing the invention as defined by the following claims. For example, the beam body may not be entirely heat treated. Also, various portions along the length of the beam body that are heat treated and non heat treated.

What is claimed is:

1. A side intrusion beam assembly comprising:
    a pair of end brackets, at least one of said brackets having a weld portion;
    a beam body coupled to said brackets, said weld portion and said beam body forming a gap therebetween,
    weld material filling said gap and coupling the beam body to the weld portion.

2. A side intrusion beam as recited in claim 1, wherein said weld portion comprising a slot.

3. A side intrusion beam as recited in claim 1, wherein said beam comprising a hat-shaped cross section.

4. A side intrusion beam as recited in claim 2, wherein said slot having said weld material therein.

5. A side intrusion beam as recited in claim 1, wherein said weld portion comprising a recess portion.

6. A side intrusion beam as recited in claim 1, wherein said beam comprises a round cross-section.

7. A side intrusion beam as recited in claim 1, wherein said beam comprises a rectangular cross-section.

8. A side intrusion beam as recited in claim 1, wherein said beam comprises a triangular cross-section.

9. A side intrusion beam as recited in claim 1, wherein said beam body is at least partially heat-treated.

10. A side intrusion beam as recited in claim 1 wherein each of said brackets having a weld portion, and each of said weld portions forming a gap between said beam body and said weld portion, each of said gaps having said weld material filling said gap.

11. A side intrusion beam assembly for a vehicle door having bracket mounting positions comprising:
    a pair of end brackets having a weld portion;
    a beam body coupled to said brackets so that said bracket correspond to the bracket mounting positions, said weld portion and said beam body forming a gap therebetween; and
    weld material filling said gap and coupling the beam body to the weld portion.

12. A side intrusion beam assembly as recited in claim 11, wherein said weld portion comprising a slot.

13. A side intrusion beam assembly as recited in claim 11, wherein said beam comprising a hat-shaped cross section.

14. A side intrusion beam assembly as recited in claim 12, wherein said slot having said weld material therein.

15. A side intrusion beam assembly as recited in claim 11, wherein said weld portion comprising a recess portion.

16. A side intrusion beam assembly as recited in claim 11, wherein said beam comprises a round cross-section.

17. A side intrusion beam assembly as recited in claim 11, wherein said beam comprises a rectangular cross-section.

18. A side intrusion beam assembly as recited in claim 11, wherein said beam comprises a triangular cross-section.

19. A side intrusion beam assembly as recited in claim 11, wherein said beam body is at least partially heat-treated.

20. A side intrusion beam as recited in claim 11 wherein each of said brackets having a weld portion, and each of said weld portions forming a gap between said beam body and said weld portion, each of said gaps having said weld material filling said gap.

* * * * *